March 23, 1971 M. J. AUERNHAMMER 3,572,138
RECIPROCATING DRIVE
Filed Jan. 10, 1969 2 Sheets-Sheet 2
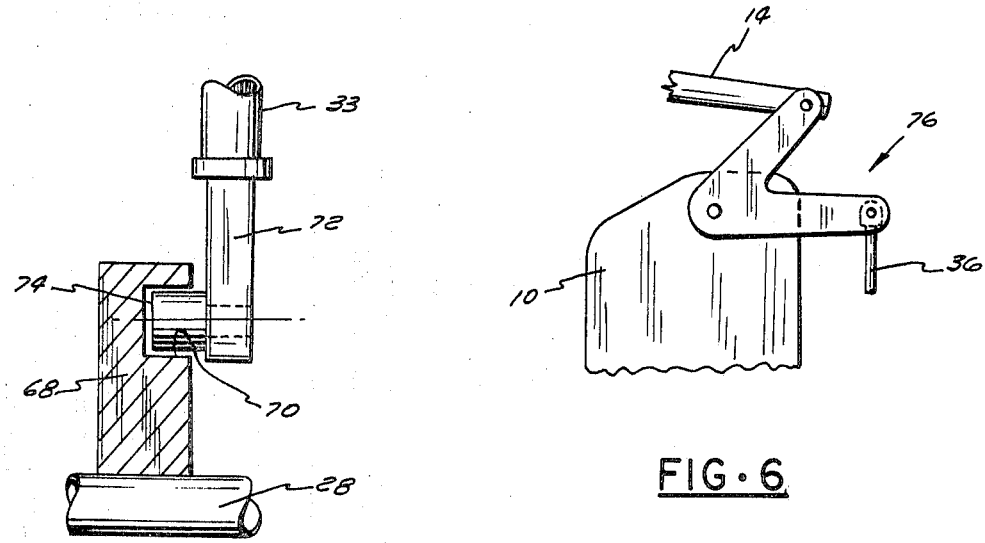
FIG·5
FIG·6
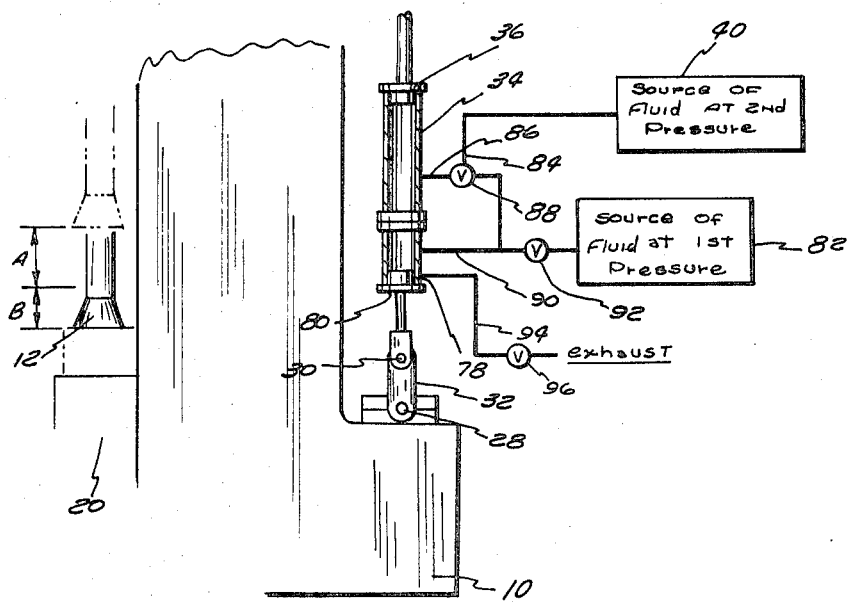
FIG·7
INVENTOR
MARCUS J. AUERNHAMMER
BY United States Patent Office 3,572,138
Patented Mar. 23, 1971

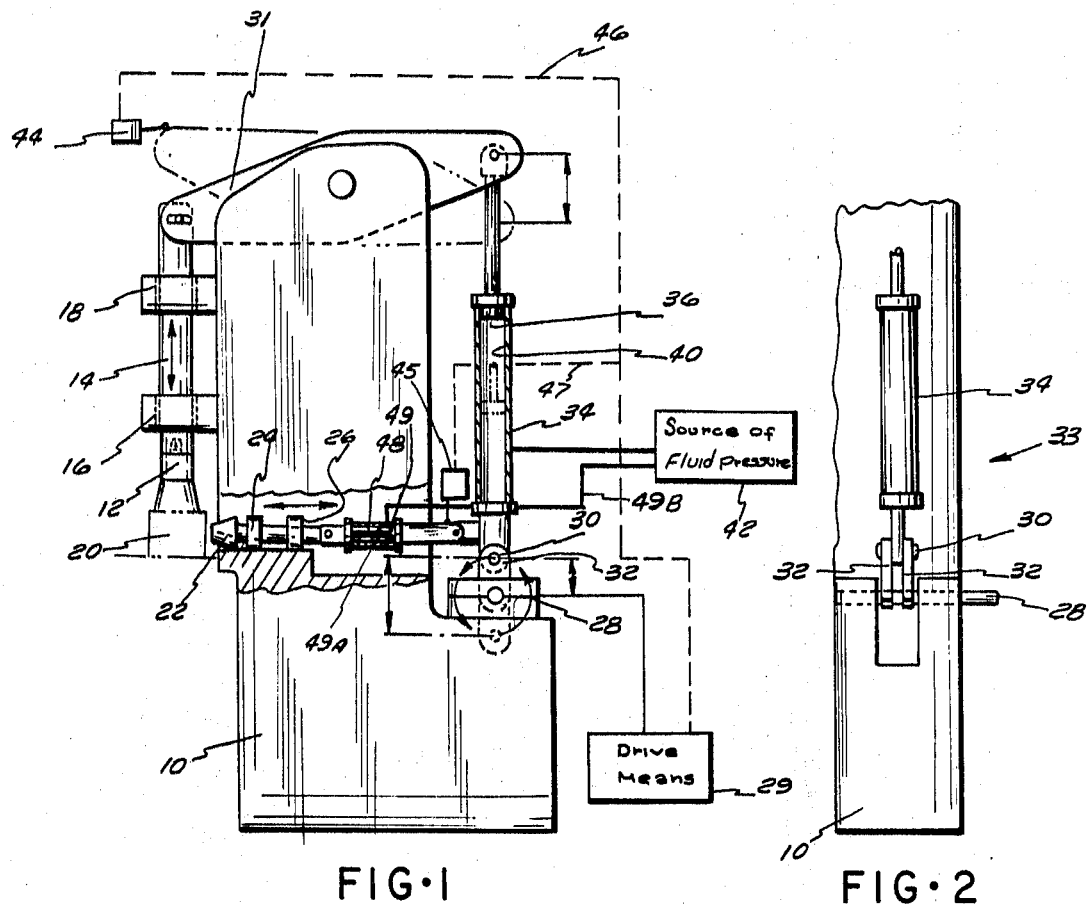
FIG·1 FIG·2
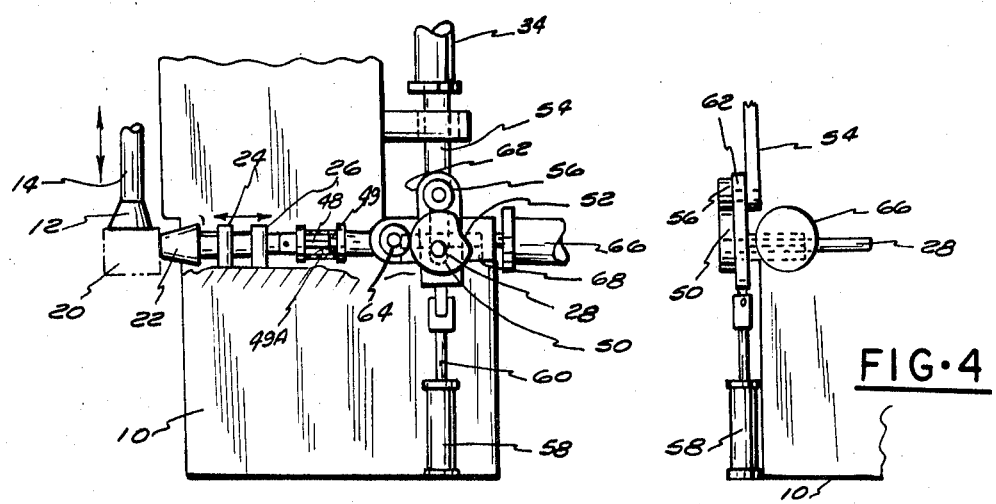
FIG·3
FIG·4
INVENTOR
MARCUS J. AUERNHAMMER
BY

3,572,138
RECIPROCATING DRIVE
Marcus J. Auernhammer, Engleside, Mich., assignor to Visi-Trol Engineering Company, Detroit, Mich.
Filed Jan. 10, 1969, Ser. No. 790,424
Int. Cl. F16h 21/18
U.S. Cl. 74—50
16 Claims

ABSTRACT OF THE DISCLOSURE

Various drive line arrangements for connecting a tool to a rotating drive shaft in order to provide a controlled, reciprocating tool motion with a pneumatic overload device protecting the drive shaft when the tool becomes jammed or is subjected to an abnormal load.

BACKGROUND OF THE INVENTION

This invention relates to machines having a tool or other driven member that is reciprocated by a rotating drive member, and more specifically to such a machine having a fluid piston and cylinder connected between the tool and the driving member to function as an overload device that allows the driving member to continue its rotation whenever the tool is restrained against its motion by a predetermined load.

It is common practice to design manufacturing machines with one or more tools that are moved in a reciprocating motion as they establish an operating contact with a workpiece. The tool is often connected through a suitable linkage to either a cam or a crank carried on a rotating drive shaft so as to move the tool in synchronization with the shaft's rotation.

One problem that occasionally arises in such machines is that the tool becomes jammed or otherwise restrained against its normal motion because of an abnormal contact with the workpiece. If the driving shaft continues to rotate under such circumstances, there is a risk of one or more of the connecting components becoming damaged unless some form of overload means is provided. One form of such overload known in the art comprises connecting a fluid piston and cylinder between the driving shaft and the tool in a manner that allows the driving member to continue its rotation whenever the tool is restrained. One of the purposes of the present invention is to provide an improved fluid overload for a mechanical drive system.

Another problem associated with reciprocating drive systems is that it is often desirable to drive the tool such that its operating contact with the workpiece does not exceed a predetermined force during a portion of its stroke, and then does not exceed a different predetermined force during the remainder of its stroke. For instance, the tool may initially move a pair of bearing members relative to one another into alignment with a relatively light force, and then press fit them with a heavier force. Accordingly the present invention also provides an overload device that functions in response to different overload forces during different portions of the tool's operating contact with the workpiece.

Another problem associated with reciprocating drives is that the tool is often driven in a cyclic motion which is synchronized with the motion of the driving shaft. In a typical configuration a cam, mounted on the driving shaft, has a predetermined contour formed about the axis of its rotation. The tool is connected to the cam such that its motion varies as the contour. If, however, the tool is restrained by the workpiece, continued rotation of the shaft moves the cam out of phase with the tool.

Still another problem often confronting the designer of such machines is to provide two reciprocating tools that must be driven in synchronized motions in different directions with respect to one another. The present invention also solves these latter problems.

SUMMARY OF THE INVENTION

The preferred embodiment of the present invention comprises a machine having a tool connected by a mechanical drive line to a crank carried on a driving shaft. The drive line includes a fluid cylinder that moves with the crank, and a piston, mounted in the cylinder to form a fluid chamber, and connected to move with the tool. The piston rod is normally fully extended with respect to the cylinder by fluid pressure in order to form a substantially rigid link in the drive line. When the operating contact of the tool on the workpiece exceeds a predetermined force that corresponds to the fluid pressure in the cylinder, the piston and the cylinder commence to move against the fluid pressure toward their retracted position to allow the drive shaft to continue its motion even though the tool's motion is restrained. The piston and cylinder continue to extend and retract until either the shaft's rotation is terminated, or the tool's restraint is removed.

When the tool has been restored to its normal operating condition, it is returned to the position in its stroke that corresponds to the rotary position of the shaft by returning the piston to its normal fully extended position. Thus, in addition to providing overload protection, the piston and cylinder arrangement provides means for matching the tool's position to that of the driving shaft so that they will again move in synchronized motions.

A second tool is also mounted on the preferred machine for reciprocating movement in directions at a predetermined angle relative to the motion of the primary tool. By providing a link between the second tool and the shaft, both tools can be reciprocated in synchronized motions from a common source of power. The arrangement is such that the tools sequentially contact the workpiece to perform a pair of operations. A variation of the preferred embodiment connects both tools to a cam, instead of a crank, so that they move toward and away from the workpiece in a motion that varies as the cam's contour.

In another embodiment of the invention, two fluid cylinders are connected end-to-end in the drive line with the piston of one being connected to the tool and the piston of the other cylinder being connected to the drive shaft. One piston is normally always extended, while the other is retracted during the initial portion of the tool's working stroke, and then extended during the remainder of its stroke. The overload force during the initial portion of the tool's contact, is determined by the fluid pressure behind the extended piston. A higher fluid pressure is then introduced into both cylinders. This higher pressure steps up the overload pressure, and also moves the retracted piston toward its extended position. The tool, therefore, is moved during the latter portions of its stroke in a composite motion made up of the piston's extension and the shaft's rotation, and with a stepped up overload pressure.

In this latter embodiment, the tool initially can contact the workpiece with only a relatively light force; during the remainder of its contact, it can produce a heavier force. Thus the magnitude of the overload pressure depends on the tool's position in its stroke.

Still further advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is an elevational view of a machine having a reciprocating drive arrangement in accordance with the preferred embodiment of the present invention, with parts shown in section for purposes of description;

FIG. 2 is a fragmentary view of the preferred machine as seen from the right side of FIG. 1;

FIG. 3 shows a variation of the invention in which the tool is driven by a cam as opposed to the crank of FIG. 1;

FIG. 4 is a fragmentary view of the machine of FIG. 3 as seen from the right side thereof;

FIG. 5 is an enlarged view showing another form of cam driving connection;

FIG. 6 is a fragmentary view showing another form of lever for connecting the motion of the driving shaft to the tool; and FIG. 7 shows another embodiment of the invention employing a pair of fluid cylinders for varying the overload pressure, and for providing a composite motion during the tool's operating contact.

DESCRIPTION OF THE PREFERRED EMBODIMENTS

Now referring to the drawings, the preferred embodiment of the invention is illustrated in FIGS. 1 and 2 as comprising a machine having a frame 10. A first tool 12, carried on the end of a holder 14 that is slidably supported in a pair of bearings 16 and 18, is vertically movable toward and away from a workpiece 20. The tool 12 is moved down to engage the workpiece in an operating contact, for instance to press fit a pair of bearing components together, and then moved upwardly upon completion of its contact.

A second tool 22 is also mounted on the frame 10 by a pair of bearings 24 and 26 for motion in horizontal directions toward and away from the workpiece 20. The tool 22 can perform a placing function, or other suitable work functions on the workpiece. It could also be mounted for reciprocating motion in directions other than horizonotal to accommodate either the nature of its working contact or the character of the workpiece. The particular function performed by the tools 12 and 22 is not as important as is their operating motion so that a further reference to their configuration is not necessary for understanding the manner in which the invention is practiced.

Both tools 12 and 22 are driven from a crankshaft 28 which is rotatably mounted on frame 10, and connected to a normally continuously rotated drive means 29. A crank pin 30, carried by a pair of cranks 32 on the crank shaft 28, is connected to the tool 12 by a fluid overload device 33 and a lever 31 which reciprocates the tool 12 as the crankshaft is rotated. The overload device 32 comprises a cylinder 34 connected to the crank pin 30. A piston 36, slidably mounted in the cylinder 34 between extended and retracted positions, has a rod connected to one end of the lever 31. The midsection of the lever 31 is fulcrumed on the frame 10, and its opposite end is connected to the tool holder 14. An expansible fluid chamber 40, formed by piston 36 and the cylinder 34, is connected to a source of fluid pressure 42 which is operative to maintain at least a minimum predetermined fluid pressure within the chamber 40.

The fluid pressure in the chamber 40 can be provided by either a pneumatic or a hydraulic pressure source, and is chosen so as to be sufficient to normally maintain the piston 36 in its fully extended position during the tool's entire working contact unless a predetermined force abnormally restrains the tool's motion. Thus the piston 36 and the cylinder 34 normally act as a rigid motion transmitting link so that the tool 12 is moved in synchronization with the rotation of the crank pin 30. The pressure in the cylinder 34 accommodates the normal operating contact of the tool 12. When its contact with the workpiece 20 exceeds a predetermined overload force that opposes the downward tool motion, the piston 36 commences to move toward its retracted position against the pressure of the fluid thereby permitting the crankshaft 28 to continue its rotation.

Thus it is to be understood that the piston 36 and the cylinder 34 are normally fixed against relative motion by the fluid pressure in the chamber 40 whenever the workpiece 20 does not provide an abnormal restraint against the tool's motion. When a circumstance occurs that produces such an abnormal restraint or overload, the piston 36 and the cylinder 40 commence to move relative to one another against the fluid pressure in the chamber 40. It is apparent that by changing the minimum pressure that is maintained in the chamber 40, the overload force, necessary to move the piston 36 relative to the cylinder 40, can be varied in order to accommodate the particular nature of the operating contact between the tool 12 and the workpiece 20.

Suitable switch means 44 and 45 are adapted to sense the motion of the tools 12 and 22, respectively, and in response to an irregularity in the normal cycle of either tool de-activate the drive means 29 through connections 46 and 47 so that the tool 12 can be restored to its normal operating condition. It is apparent that an overload condition that produces relative motion between the piston 36 and the cylinder 34 will cause the crankshaft 28 to move out of phase with respect to the tool 12. After the tool 12 has been returned to its operating condition, it is returned to the position in its operating motion that corresponds to the rotary position of the crankshaft 28 by returning the piston 36 to its fully extended position. The fluid overload device 33 therefore functions not only to protect the crankshaft and its drive line components, but also provides means for insuring that the tool and the crankshaft 28 are in the same relative positions in their respective cycles when the machine is returned to its normal operation.

Similarly a piston 48 and a cylinder 49 connect the horizontally movable tool 22 to the cylinder 34 so as to synchronously reciprocate the tool 22. The piston 48, connected to the tool 22, and cylinder 49, connected to the cylinder 34, form a fluid chamber 49A that is connected to the fluid pressure source 42 by a connection 49B to perform an overload function similar to overload device 33. Therefore both the tool 12 and the tool 22 are driven from a common source of power, that is, the crankshaft 28 and each has a fluid overload. In addition, because of the angular relationship between their respective motions they approach the workpiece 20 from different directions. Obviously the two tools could be mounted for movement in other angular relationships, and also with different strokes. It is also apparent that the connection between each tool and the crankshaft is such that they move toward and away from the workpiece in cycles that are out of phase with one another. Thus one tool can be moved toward the workpiece as the other tool is being moved away from the workpiece. This difference in phase between the cyclic motions of the two tools can be usefully employed to contact the workpiece in a particular sequence.

FIGS. 3 and 4 illustrate a modified driving arrangement for moving the tools 12 and 22 in synchronized motion from the crankshaft 28. In this arrangement, a cam 50, carried on the shaft 28, has a predetermined, continuous contour 52 formed about its axis of rotation. A member 54, slidably mounted on frame 10, has an upper end connected to the overload cylinder 34, and its lower end connected to a cam roller 56 which rides on the contour 52 of the cam. A fluid cylinder 58, mounted on the frame 10, has a piston rod 60 connected to a yoke 62 which biases the roller 56 toward continuous engagement with the cam as the shaft 28 is being rotated. Thus the roller 56 insures that the motion of tool 12 varies in accordance with the variations in the cam's contour 52. The cam 50, therefore, provides means for moving the tool with predetermined variations in its motion as opposed to the harmonic motion that would be produced by the crank arrangement of FIG. 1 when drive means 29 has a uniform rotary output.

A cam roller 64 is also connected to the tool 22 so that it too moves according to the contour 52 of the cam. A cylinder 66, mounted on the frame 10 and connected to a yoke 68, biases the roller 64 toward continuous engagement with the contour 52 of the cam. The tool 22 therefore is moved with the same motion as the tool 12 but in a cycle that is out of phase by about 90°, and in directions at an angle of about 90° with respect to the motion of tool 12.

FIG. 5 shows another variation for imparting a variable motion to the tool 12 with respect to the uniform rotation of the shaft 28. In this variation, a driving cam 68, mounted on the shaft 28, is formed with a continuous cam groove 70 which extends about the cam's axis of rotation. The groove 70 has a predetermined continuous contour accommodating the tool's reciprocating motion. A follower 72, mounted on the lower end of the overload cylinder 33, carries a cam roller 74 that is disposed in the cam groove 70 in such a manner that as the shaft 28 is rotated, the follower 72 is moved up and down in accordance with the contour of the groove 70 and thereby imparts a similar motion to the tool 12.

FIG. 6 shows a variation of the invention in which the lever 31 has been replaced by a forked lever 76 that is pivotally mounted on the frame 10. The lever 76 has one arm connected to the rod of the piston 36 and its other arm connected to the tool holder 14 which is supported to reciprocate the tool 12 in directions other than the vertical direction illustrated in FIG. 1.

FIG. 7 shows another variation of the invention in which the tool 12 is moved into operating contact with the workpiece 20 in a downward stroke that consists of a primary motion, and then a secondary motion.

In this embodiment of the invention, a secondary cylinder 78, mounted on the closed side of the overload cylinder 34, has a piston 80 connected to the crank pin 30. Both of the cylinders 34 and 78 are connected to two sources of fluid pressure, including the source 40, and a second source 82. The source 40 is connected to the cylinder 34 by a conduit 84 and a conduit 86. A valve means 88 is disposed in the connection between the two conduits to either open or close a connection between the source 40 and the cylinder 34. The source 82 is connected by a conduit 90 to the cylinder 78. The conduit 90 is also connected to the conduit 86 to provide a connection between the source 82 and the cylinder 34. A valve 92 in conduit 90 provides means for opening and closing the outlet of the source 82. The cylinder 78 also has an exhaust conduit 94 and an exhaust valve 96 for removal of pressurized fluid from behind the piston 80.

When the embodiment of FIG. 7 is being operated, the piston 36 is normally fully extended so as to function as an overload device. The piston 80 and its cylinder 78, however, are extended and retracted during each working cycle of the tool 12. During the initial portion A of the downward stroke of the tool 12, the piston 80 is fully retracted and piston 36 is fully extended within their respective cylinders. For purposes of illustration, the valve means 88 is adjusted to open a connection between the overload cylinder 34, and source 40 to maintain 100 p.s.i. fluid pressure behind piston 36 and valves 92 and 96 are closed. During the initial portion of the tool's stroke, it contacts the workpiece 20 with a relatively light force with the overload device yielding if the motion of the piston is opposed by a force exceeding the overload force associated with the 100 p.s.i. fluid pressure.

At a suitable position in the rotation of the shaft 28, the valve 88 is re-positioned to isolate the source 40 from both cylinders 34 and 78 and to open the conduit 86 for passage of fluid pressure from source 82 and cylinder 34. The valve 92 is then opened so that fluid from the source 82 is introduced into both cylinders. Assuming the fluid from source 82 is at a pressure of 1000 p.s.i., the piston 36 remains in its fully extended position, however, the cylinder 78 commences to move upwardly as the piston 80 is extended under the influence of the high pressure fluid.

As the tool 12 is being moved during the final portion B of its stroke, the overload pressure of 1000 p.s.i. increases the overload force that must be exceeded in order to produce relative motion between the overload piston 36 and the cylinder 34. This allows the tool to contact the workpiece during the final portion of its stroke with a greater force than during its initial downward motion. In addition, the relative motion between the piston 80 and the cylinder 78 during this portion of each cycle imparts the tool 12 with a composite motion made up of the shaft's rotation and the upward motion of the secondary cylinder 78. At the conclusion of the tool's stroke, the fluid source 82 is isolated from the two cylinders by closing the valve 92 and the high pressure fluid exhausted from the cylinder 78 by opening an exhaust valve 96. The fluid pressure in the cylinder 34 is returned to its lower value of 100 p.s.i. by opening the valve 88. This procedure is repeated during each operating cycle of the tool 12.

Thus it is to be understood that I have described in detail a novel reciprocating drive having a fluid overload and various means for controlling the motion of one or more tools that are reciprocated by a rotated drive shaft.

Having described my invention, I claim:

1. In a motion transmitting device having a movable driving member, a driven member, and means for imparting motion to said driving member, the combination of a fluid cylinder connected to one of said members, a piston carried for movement with said cylinder, and a fluid maintained within the cylinder at a predetermined pressure such that the cylinder and the piston, during normal operation, operate as a solid motion-transmitting element between said members, and in response to a predetermined resistance to the motion of the driven member, are moved relative to each other against the fluid pressure as said means continues to impart motion to said driving member; and including means for varying the pressure of the fluid in said cylinder to vary the resistance which causes the cylinder and the piston to move relative to each other.

2. The combination as defined in claim 1, in which the driving member is supported for rotation, and the driven member is reciprocated by the driving member at such times as the piston and cylinder form a solid motion-transmitting element.

3. The combination as defined in claim 1, including a second movable driven member connected to the driving member so as to be moved as said means is imparting motion to driving member.

4. The combination as defined in claim 3, in which the first mentioned driven member is connected to the driving member so as to be reciprocated when the piston and cylinder form a solid motion-transmitting element, and including second piston and cylinder means connecting the second driven member to the driving member to reciprocate the second driven member in a timed relationship with the first mentioned driven member.

5. The combination as defined in claim 4, including a tool carried by each of said driven members, and wherein the driven members are moved by the driving member such that the tools contact a workpiece in a predetermined sequence.

6. The combination as defined in claim 1, in which the driven member is movable into operating contact with a workpiece, and the fluid pressure in the cylinder is maintained to allow the piston and cylinder to be moved relative to each other only when said predetermined resistance is produced by said operating contact.

7. The combination as defined in claim 1, in which the fluid in the cylinder is maintained at a first pressure during a portion of the operating contact of the driven member, and a second pressure during the remainder of the operating contact.

8. The combination as defined in claim 1, in which the driving member comprises a rotatable shaft having a crank, and the driven member is connected to the crank so as to be reciprocated as the shaft is rotated.

9. The combination as defined in claim 1, in which the driving member comprises a rotatable cam having a variable contour formed about its axis of rotation, and the driven member is connected to said cam so as to be moved in a motion that varies as the cam's contour.

10. The combination as defined in claim 1, in which the piston is carried by the cylinder for movement between a retracted position and a fully extended position, and is disposed in one of said positions when it forms a solid motion transmitting element with the cylinder.

11. In a machine the combination comprising:
(a) a frame;
(b) a driving member rotatably mounted on the frame;
(c) a first tool supported on the frame, and connected to the driving member so as to be reciprocated along a path in which it is moved alternately toward and then away from a workpiece as the driving member is rotated; and
(d) a second tool supported on the frame, and connected to the driving member so as to be reciprocated along a path in which it is moved alternately toward and away from the workpiece in timed relationship to the motion of the first tool as the driving member is rotated.

12. The combination as defined in claim 11, in which the first and second tools are supported on the frame so as to be movable relative to the workpiece in directions substantially at right angles to one another.

13. In an assembly machine, the combination comprising:
(a) a frame;
(b) a tool member mounted on the frame so as to be movable thereon under certain circumstances and restrained against motion under other circumstances;
(c) a driving member;
(d) means for imparting cyclic motion to the driving member;
(e) a cylinder connected to one of said members so as to be movable therewith;
(f) a piston connected to the other of said members so as to be movable therewith, the piston being carried for movement with the cylinder;
(g) a compressible fluid maintained at a predetermined pressure in said cylinder such that the cylinder and piston are fixed in a predetermined relative position to operate as a solid motion-transmitting element between the tool member and the driving member unless a predetermined force resists the motion of the tool member, and are moved from their relative position against the fluid pressure in response to said predetermined force; switching means for sensing the motion of said tool member and for deactivating said driving member in response to an irregularity in the normal cycle of said tool member so that the tool member can be returned to the position in its motion corresponding to the position of the driving member by returning the cylinder and piston to their predetermined relative position.

14. The combination as defined in claim 13, in which the tool member is operable to contact a workpiece with an operating force less than a predetermined overload force corresponding to the pressure of the cylinder, and the piston and cylinder are moved relative to one another when the operating force exceeds the overload force.

15. In a motion transmitting device having a movable driving member; a driven member; and means for imparting motion to said driving member, the combination of a pair of fluid cylinders each having a movable piston; a fluid maintained at a first pressure in one of the cylinders during a first portion of the motion of the driven member, and at a second pressure during a second portion of the driven member's motion so as to form a solid motion-transmitting element between the two members, and means for introducing fluid at one of said pressures into the other cylinder to move its piston in a relative motion such that the driven member is moved with the driving member during one of the portions of its motion, and is moved with a composite motion during the other portion of its motion.

16. The combination as defined in claim 15, in which both of said cylinders are connected such that their respective pistons are movable along a common axis of motion.

References Cited

UNITED STATES PATENTS

| | | | |
|---|---|---|---|
| 1,415,852 | 5/1922 | Van Horn | 74—41 |
| 2,086,302 | 7/1937 | Schlenker | 74—50 |
| 2,293,916 | 8/1942 | Patterson | 74—41 |
| 3,418,983 | 12/1968 | Sossna | 123—90 |
| 1,978,333 | 10/1934 | Woolson | 74—53 |

FOREIGN PATENTS

| | | | |
|---|---|---|---|
| 124,011 | 10/1900 | Germany | 74—53 |

FRED C. MATTERN, Jr., Primary Examiner

W. S. RATLIFF, Jr., Assistant Examiner